Patented June 7, 1932

1,861,922

UNITED STATES PATENT OFFICE

ARTHUR HOUGH, OF PASSAIC, JOHN ROY DUFFORD, OF PATERSON, AND WILLIAM CLELLAND LEONHARD, OF PASSAIC, NEW JERSEY

NITRATION OF SHREDDED AND BALED CELLULOSE

No Drawing.     Application filed March 29, 1930. Serial No. 440,150.

The present invention relates to the nitration of a new and improved form of cellulosic material.

The present invention has particular reference to the nitration of cellulose in the form of vegetable parchment and waterleaf or nitrating tissue in a new condition. This can be nitrated in bulk or in mass, at the same time enabling the nitrating acids to have free access to each and every part of the material, resulting in a small and practically uniform rise of temperature throughout the mass, or at least a rise of temperature that is well within the limits predetermined for economical and satisfactory nitration results. Such a nitrating condition avoids local decomposition so frequent and annoying and costly in the ordinary nitration methods using cellulosic materials of the prior art.

Heretofore sheets of paper-like material, for example parchmentized waterleaf or unparchmentized waterleaf or nitrating tissue, have been torn into small pieces (say 0.5 inch by 1 inch) and nitrated, such material being about .003 inch in thickness (corresponding to 25 lb. paper). In the prior art, these were blown, by a blast of conditioned air into the mixed nitrating acids, and has usually been done in a centrifugal machine. The product was then removed and thoroughly washed with water, and dried. Even with extreme care, the pieces of paper would stick together, causing difficulties in the process.

It was impractical to use the displacement process in the nitration and washing, because the sheets would tend to pack together, into masses, in which many pieces of paper would pack.

In another copending application, Ser. No. 132,906 filed August 21, 1926, a process of nitrating parchmentized paper is described, the parchmentized paper being nitrated and washed by the displacement process.

Our present invention relates to a modification of the normal condition of nitrating tissue or waterleaf or vegetable parchment which is initially a flat sheet, by changing such flat sheet into long narrow shreds or pieces of a somewhat irregular form. We preferably employ for this shredding step, the machine described in U. S. Patent 1,178,386, which carries out our idea admirably. The sheets of waterleaf or vegetable parchment are passed through this machine, which converts it into long narrow irregularly matted shreds having the form indicated, and this product, even when compressed within reasonable limits, allows of free access of the nitrating acids to the entire area of the paper, and the substance is uniformly nitrated without any undue rise of temperature locally. Such a condition of the material to be nitrated can be handled satisfactorily in any of the conventional types of nitrating machinery or devices, even by the displacement type, which is preferred.

The irregular mass of shredded material may be compressed into a bale of considerable density and placed in a nitrating pan and the nitrating acids actually poured onto the mass without the least danger of decomposition due to local heating, and a very uniform nitration results. The following is a description of actual tests conducted along such lines:

*Example 1.*—A bale of the shredded vegetable parchment was prepared by compressing the same in a suitable hand press, to a density corresponding to four pounds per cubic foot, and held in shape throughout the subsequent nitration period by being bound with lead covered wire. Other suitable binding materials such as aluminum wire could be used instead of lead covered wire. This bale was then placed in a nitrating pan, and the nitrating acids poured over the bale till the bale was completely covered and the acid extending over the top of the bale about one-half inch, a heavy perforated plate being placed on top of the bale, to prevent the bale from floating. It was allowed to stand nitrating for one hour, a thermometer being placed with the bulb extending to the center of the bale. Observations showed that the only rise of temperature in the center of the bale was that equivalent to the normal rise due to the nitration reactions. The reaction proceeding smoothly, the process was then carried on under the standard method employed in the displacement process of nitration, and afterwards the bale was removed from the pan and examined. Samples of the product were taken from the center and outside of the bale. These were examined and both samples were found to contain the same percent of nitrogen.

*Example 2.*—A bale of shredded waterleaf (unparchmentized) was then made up of the same weight and volume as the vegetable parchment in the above test, and the test carried out in exactly the same manner in every particular, and the results were just as satisfactory.

The very porous and permeable condition of the bale of waterleaf or vegetable parchment enables it to be nitrated by the displacement process, whereas if the waterleaf were not shredded it would be almost impossible to nitrate successfully by this process.

In the displacement process the substance undergoing nitration is undisturbed and it follows therefore that whatever fine material, if any, is held on the surfaces of the shredded sheet is not carried into the spent acid when the latter is displaced by the water. The spent acid, therefore, will be practically free from organic matter which is a source of trouble during the subsequent reclaiming of the spent acid in that it decomposes causing the formation of nitrous acid which is very objectionable.

Another important advantage incident to the employment of the shredded waterleaf and vegetable parchment is the fact that the displacement of the acids can be carried on in one-third the time found necessary with ordinary cotton as linters or cops, and the yield of displaced acids, using the shredded substances, is higher than when cotton is employed for nitration.

It is evident, therefore, that the use of this material in this shredded condition opens up a new field in the nitration industry. Instead of small charges of a maximum of 65 pounds being employed in the displacement process, large bales of any practical size, say 1000 pounds, may be nitrated, and production increased enormously with a plant of a given size. There is also the important factor of prevention of " fume off " and much greater safety to the operators.

Another important feature is the ease and economy of drying. Instead of having to dry the raw material to the limit required for nitration by the costly method of the prior art, the shredded substance may be baled, and placed in a vacuum dryer or is placed in a container and warm air blown through it, thereby effecting the drying at the smallest expense and more efficiently and uniformly. The shredded condition also adds to the ease of stabilizing the nitro-product. When the nitrated shredded vegetable parchment, waterleaf or nitrating tissue is placed in the boiling vats (stabilizing process), the material does not clot together but retains its original condition, allowing of free access of the boiling water, and consequently is in an ideal condition to stabilize quickly and uniformly.

When nitrating shredded vegetable parchment, waterleaf or nitrating tissue in bulk by adding the nitrating acid to the material we prefer to follow the method of introducing the nitrating acid through a pipe at the bottom of the nitrating receptacle, in such a manner as to substantially eliminate the air included in the mass, and allowing the acid to rise at such a rate through the mass as will remove the included air.

We claim:—

1. The process of nitrating cellulose which comprises subjecting the cellulose in the form of sheets of paper-like thickness to a shredding operation to give a mass of long strips, baling the mass of such shredded material, and nitrating the latter, substantially as described.

2. The process of nitrating parchmentized cellulose in the form of sheets of paper-like thickness, which comprises subjecting such sheets to a shredding operation to give a shredded product, forming an irregularly-matted bale from such shredded material and thereafter nitrating the shredded product, substantially as described.

3. The process of nitrating cellulosic bodies which comprises subjecting cellulose sheets to a shredding operation to give a shredded product, forming a readily permeable bale, nitrating the shredded cellulosic body in the form of said readily permeable bale, and washing out acid from said baled material, substantially as described.

4. The process of nitrating parchmentized paper which comprises subjecting the same to a shredding operation to give a shredded product, forming a readily permeable bale, nitrating said readily permeable bale of the shredded material, and washing by boiling in water and then dehydrating same, substantially as described.

5. The nitration of a porous bale of shredded cellulose sheets by the displacement process, substantially as described.

6. The method of nitrating shredded vegetable parchment, waterleaf or nitrating tissue, by flowing the nitrating acid into contact with a bale of the said material in such a manner as to drive out the bulk of the air contained in the mass, substantially as described.

7. A process which comprises converting sheets of cellulose, of paper-like thickness into long narrow shreds, forming a mass of such shreds into a bale and bringing nitrating acid into contact with said bale, while driving out air contained in the interstices thereof, allowing nitration to proceed until sufficiently completed, and washing the nitrated product, while still in the form of a bale, by displacement.

8. A process which comprises converting sheets of cellulose, of paper-like thickness into irregular shreds, forming a mass of such shreds into a bale, drying the bale of material while under reduced atmospheric pressure, and bringing nitrating acid into contact with said bale, while driving out air contained in the interstices thereof, allowing nitration to proceed until sufficiently completed, and washing the nitrated product, while still in the form of a bale, by displacement.

ARTHUR HOUGH.
JOHN ROY DUFFORD.
WILLIAM CLELLAND LEONHARD.